(12) United States Patent
Earle

(10) Patent No.: US 6,523,802 B1
(45) Date of Patent: Feb. 25, 2003

(54) TUNABLE MECHANICAL TEMPERATURE COMPENSATOR

(75) Inventor: Matthew S. Earle, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 40 days.

(21) Appl. No.: 09/905,280

(22) Filed: Jul. 13, 2001

(51) Int. Cl.[7] .......................... F16M 11/00; G02B 7/02
(52) U.S. Cl. ....................................... 248/694; 359/820
(58) Field of Search ................................ 248/550, 542, 248/543, 694; 359/820

(56) References Cited

U.S. PATENT DOCUMENTS

| | | | | |
|---|---|---|---|---|
| 3,790,250 A | * | 2/1974 | Mitchell et al. | 359/289 |
| 4,165,918 A | * | 8/1979 | Moreno | 359/820 |
| 4,236,790 A | * | 12/1980 | Smith | 359/820 |
| 4,848,881 A | * | 7/1989 | Kahan et al. | 359/288 |
| 5,570,238 A | * | 10/1996 | Leary | 359/819 |
| 6,236,139 B1 | * | 5/2001 | Hill et al. | 310/307 |

* cited by examiner

Primary Examiner—Anita King

(57) ABSTRACT

A controlled-expansion structure has a controlled thermal expansion along a control axis extending between two marker locations over a temperature range. The controlled-expansion structure includes a first expansion element having a first marker location and a first contact surface, the first expansion element having a first coefficient of thermal expansion; and a second expansion element having a second marker location and a second contact surface. The second expansion element has a second coefficient of thermal expansion different from the first coefficient of thermal expansion. The controlled-expansion structure further includes a freely movable interface formed by a contact between the first contact surface and the second contact surface. The interface is oriented at an interface angle relative to the control axis of greater than 0 but less than 90 degrees.

17 Claims, 4 Drawing Sheets

TUNABLE MECHANICAL TEMPERATURE COMPENSATOR

This invention relates to the compensation of dimensional changes that occur as a result of temperature changes and, more particularly, to a mechanical structure that provides such temperature compensation.

BACKGROUND OF THE INVENTION

Nearly all materials have a nonzero coefficient of thermal expansion. Specifically, the dimensions of most materials increase as the temperature increases. This thermal expansion is sometimes put to use in practical devices, but in other cases it can adversely affect the performance of a structure.

In one example, the focusing lenses of an optical system are supported in an optical support structure. The lenses have characteristic focal lengths, and the positions of the lenses and other optical elements are selected to achieve precise focusing. These positions are established at a specific temperature. When the temperature changes, the lengths of the members of the optical support structure also change, with the results that the optical elements are moved relative to each other and the precise optical arrangement is lost.

Various support structures are known in which the mechanical elements interact with each other to achieve a desired and controllable thermal expansion property of the structure that is different from the expansion properties of the individual mechanical elements. In many instances, the mechanical elements are selected to achieve a net zero coefficient of thermal expansion of the structure, so that the positions of the supported elements are unaffected by changes in temperature. In other cases, the structure must exhibit a controlled non-zero expansion as the temperature changes.

An arrangement of telescoping rings having different coefficients of thermal expansion may be used, but such a device requires a number of parts and may be mechanically unwieldy. The structure is also not easily tuned for specific performance. Bimetallic thermal-expansion structures are also known, but they exhibit too much flexure for many applications.

There is accordingly a need for an improved approach to structures that achieve a controlled thermal expansion. The present invention fulfills this need, and further provides related advantages.

SUMMARY OF THE INVENTION

The present invention provides a controlled-expansion structure that may be used to achieve zero or nonzero expansion responsive to temperature changes. (As used herein, "expansion" includes an increase in length, no change in length, and a decrease in length.) The controlled-expansion structure has only two parts in one embodiment, which may be made of common materials and readily fabricated. Its performance is determined to a large extent by the selection of mechanical parameters, rather than relying solely on the often-variable thermal expansion properties of the materials. The mechanical structural parameters may be established with precision metalworking processes. The controlled portion of the controlled-expansion structure is very stiff in compression, so that it may be used to fix the dimensions of sensitive mechanical structures.

In accordance with the invention, a controlled-expansion structure having a controlled thermal expansion along a control axis extending between two marker locations over a temperature range comprises a first expansion element having a first marker location and a first contact surface, and a second expansion element having a second marker location and a second contact surface. The first expansion element has a first coefficient of thermal expansion, and the second expansion element has a second coefficient of thermal expansion different from the first coefficient of thermal expansion. A freely movable interface is formed by a contact, typically a sliding contact, between the first contact surface and the second contact surface. The interface is oriented at an interface angle relative to the control axis of greater than 0 but less than (+/−) 90 degrees. The controlled thermal expansion between the two marker locations may be substantially zero, or it may be a positive or negative nonzero value.

The controlled-expansion structure may be implemented in any operable geometry. In one case each of the expansion elements is a hollow cylinder. In another case, each of the first expansion element and the second expansion element comprises an expansion arm and a contact strip affixed to the expansion arm and having the respective contact surface thereon. The present approach may be extended beyond two expansion elements, to three or more expansion elements interrelated to each other in the same manner as the first and second expansion elements.

The first contact surface and the second contact surface may each be planar. The first contact surface and the second contact surface may instead each be nonplanar. In one nonplanar arrangement, one of the contact surfaces serves as a cam surface, and the other serves as a cam follower that rides on the cam surface.

In another embodiment, a controlled-expansion structure having a controlled thermal expansion along a control axis extending between two marker locations over a temperature range comprises a first expansion element having a first marker location, a first contact surface, a first mean perpendicular dimension $D_1$ measured perpendicular to the control axis, a mean height dimension $H_1$ measured between the first marker location and the first contact surface, a first axial coefficient of thermal expansion $\alpha_{1H}$ measured parallel to the control axis, and a first transverse coefficient of thermal expansion $\alpha_{1D}$ measured parallel to $D_1$. A second expansion element has a second marker location, a second contact surface, a second mean perpendicular dimension $D_2$ measured perpendicular to the control axis and parallel to the first perpendicular dimension, a mean height dimension $H_2$ measured between the second marker location and the second contact surface, a second axial coefficient of thermal expansion $\alpha_{2H}$ measured parallel to the control axis, and a second transverse coefficient of thermal expansion $\alpha_{2D}$ measured parallel to $D_1$. There is a structural inequality of the first expansion element and the second expansion element such as $\alpha_{1H}$ being different from $\alpha_{2H}$, $\alpha_{1D}$ being different from $\alpha_{2D}$, and/or $D_1$ being different from $D_2$. Combinations of these inequalities are operable as well. A freely movable interface is formed by a contact between the first contact surface and the second contact surface. The interface is oriented at an interface angle $\theta$ relative to the control axis of greater than 0 but less than 90 degrees. This embodiment may utilize any of the compatible features and forms discussed earlier.

In one aspect of this embodiment, $\alpha_{1H}$ and $\alpha_{1D}$ are the same and are equal to $\alpha_1$, and $\alpha_{2H}$ and $\alpha_{2D}$ are the same and are equal to $\alpha_2$. The thermal behavior of this embodiment may be described by $$H_T = (1+\alpha_1\Delta T)H_1 + (1+\alpha_2\Delta T)H_2 + \Delta T(\alpha_1 D_1 - \alpha_2 D_2)\tan(90-\theta)$$

where $H_T=H_1+H_2$ at an initial temperature and $\Delta T$ is a temperature change from the initial temperature.

The present invention extends to a method for establishing a controlled thermal expansion along a control axis between two marker locations over a temperature range. The method comprises the steps of selecting the magnitude of the controlled thermal expansion, providing a controlled-expansion structure having one of the structures described earlier, and establishing material properties and dimensions of the first expansion element and the second expansion element, and the interface angle to achieve the controlled thermal expansion along the control axis between the first marker location and the second marker location.

The present approach achieves a controllable zero, or positive or negative nonzero coefficient of thermal expansion between the marker locations. The expansion may be made linear by using an angled but flat contact surface. The expansion may be made nonlinear by using an angled and curved contact surface. The controlled-expansion structure may be readily designed for specific desired performance and in this sense "tuned" to the expansion requirements.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
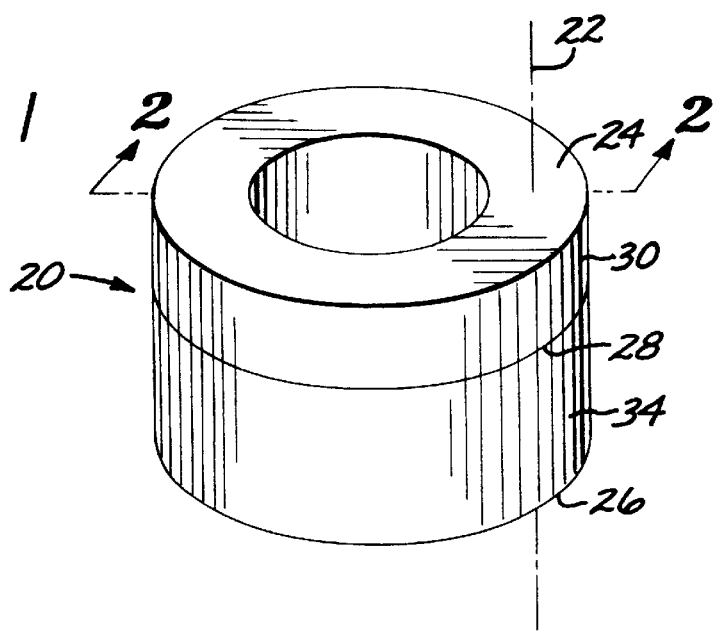
FIG. 1 is a schematic perspective view of a hollow cylindrical controlled-expansion structure.

FIG. 1 depicts a controlled-expansion structure 20 having a controlled thermal expansion along a control axis 22 extending between two marker locations 24 and 26. The controlled-expansion structure 20 of FIG. 1 is a hollow cylinder, and the control axis 22 is parallel to the cylindrical axis. In the depicted controlled-expansion structure 20, the marker locations 24 and 26 are the ends of the controlled-expansion structure 20 lying perpendicular to the control axis 22, but more generally the marker locations 24 and 26 may be any locations along the length of the structure 20 as long as they are on opposite sides of a freely movable interface 28.

Figure 2:
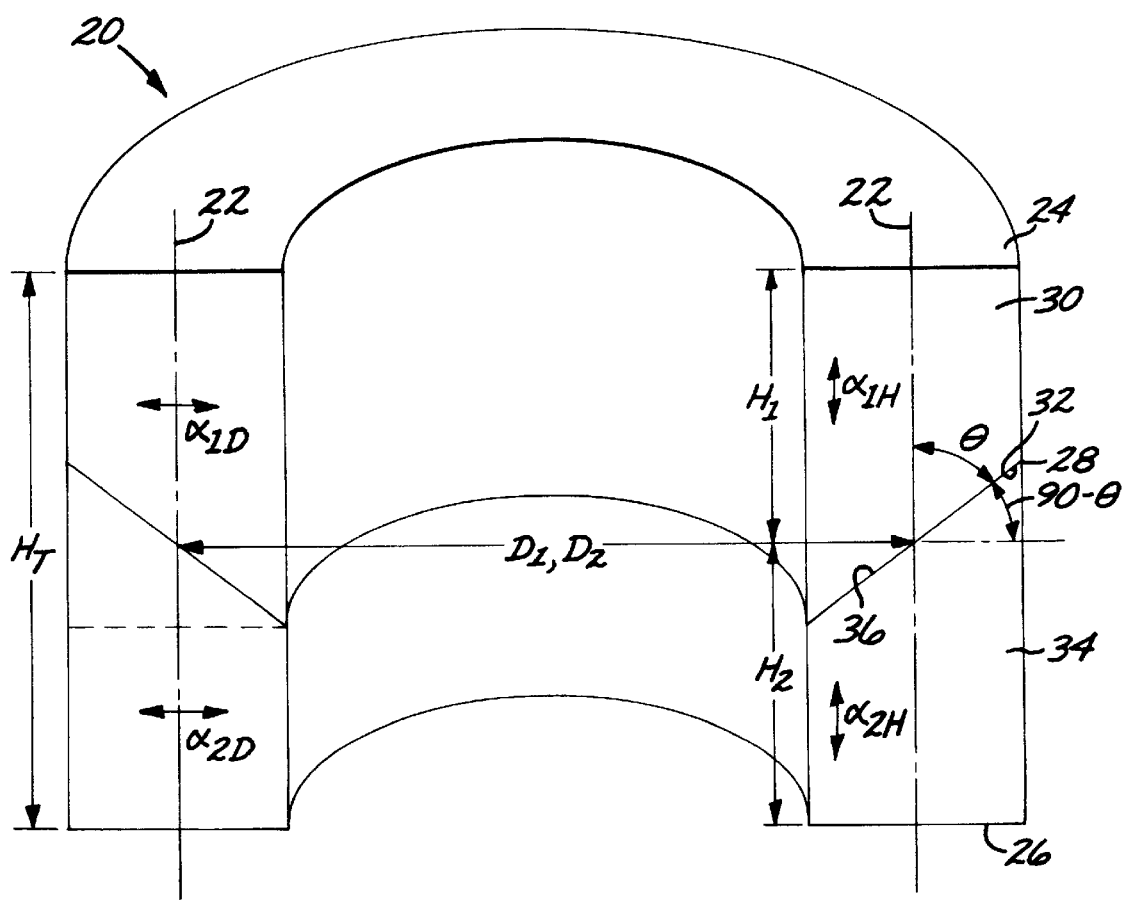
FIG. 2 is a schematic sectional view of the hollow cylindrical controlled-expansion structure of FIG. 1, taken on line 2—2.

FIG. 2 is a sectional view of the hollow cylindrical controlled-expansion structure 20 of FIG. 1. A first expansion element 30 is an axial portion of the hollow cylindrical controlled-expansion structure 20. The first expansion element 30 has the first marker location 24, here the free end surface, and a first contact surface 32. The first contact surface 32 is a nonplanar, conical surface (in this embodiment, but is planar in other embodiments) oriented at an interface angle $\theta$ to the control axis 22. A first mean perpendicular dimension $D_1$ is measured perpendicular to the control axis 22 between the central point where the first contact surface 32 intersects the radial midpoint of the wall of the hollow cylindrical controlled-expansion structure 20, on each end of a diameter marked as $D_1$. (In this embodiment, $D_1$ is measured along a cylindrical diameter.) A mean height dimension $H_1$ is measured between the first marker location 24 and the first contact surface 32 at the central point where the first contact surface 32 intersects the radial midpoint of the wall of the hollow cylindrical controlled-expansion structure 20 The first expansion element 30 has a first axial coefficient of thermal expansion $\alpha_{1H}$ measured parallel to the control axis, and a first transverse coefficient of thermal expansion $\alpha_{1D}$ measured parallel to $D_1$. For an isotropic material, $\alpha_{1H}$ and $\alpha_{1D}$ are the same and are equal to $\alpha_1$.

A second expansion element 34 is another axial portion of the hollow cylindrical controlled-expansion structure 20. The second expansion element 34 has the second marker location 26, here the free end surface, and a second contact surface 36. The second contact surface 36 is a planar surface (in this embodiment, but is nonplanar in other embodiments) oriented at the interface angle $\theta$ to the control axis 22. A second mean perpendicular dimension $D_2$ is measured perpendicular to the control axis 22 between the central point where the second contact surface 36 intersects the radial midpoint of the wall of the hollow cylindrical controlled-expansion structure 20, on each end of a diameter marked as $D_2$. (In this embodiment, $D_2$ is measured along a cylindrical diameter and is equal to $D_1$. $D_1$ and $D_2$ are not necessarily equal in other embodiments.) A mean height dimension $H_2$ is measured between the second marker location 26 and the second contact surface 36 at the central point where the second contact surface 36 intersects the radial midpoint of the wall of the hollow cylindrical controlled-expansion structure 20, The second expansion element 34 has a second axial coefficient of thermal expansion $\alpha_{2H}$ measured parallel to the control axis, and a second transverse coefficient of thermal expansion $\alpha_{2D}$ measured parallel to $D_2$. For an isotropic material, $\alpha_{2H}$ and $\alpha_{2D}$ are the same and are equal to $\alpha_2$.

The first expansion element 30 and the second expansion element 34 cannot be identical. There must be a structural inequality of the first expansion element 30 and the second expansion element 34. Preferred examples of this structural inequality are that $\alpha_{1H}$ is different from $\alpha_{2H}$, $\alpha_{1D}$ is different from $\alpha_{2D}$, and/or $D_1$ is different from $D_2$. In a case such as the embodiment of FIG. 1, where $D_1$ and $D_2$ are the same, either $\alpha_{1H}$ is different from $\alpha_{2H}$ or $\alpha_{1D}$ is different from $\alpha_{2D}$, or both. For the special (but preferred) case where both the first expansion element 30 and the second expansion element 34 are isotropic materials, $\alpha_1$ and $\alpha_2$ must be different, meaning that the first expansion element 30 and the second expansion element 34 are made of different materials.

The first contact surface 32 and the second contact surface 36 contact each other along the freely movable interface 28. In this case, the interface 28 is conical and nonplanar, and is oriented at the interface angle $\theta$ relative to the control axis 22. The interface angle $\theta$ must be greater than 0 but less than 90 degrees. (The "90 degrees" may be either +90 degrees or −90 degrees relative to the control axis 22, but is simply referred to as "90 degrees" herein. Other angles referred to herein may be measured either + or − from the control axis 22, but are referenced without sign herein.). The present invention is inoperable if the interface angle θ is 0 or 90 degrees over the entire interface 28. Preferably, θ is between about 15 degrees and about 89 degrees. If θ is below this range, the invention is operable but it is increasingly difficult to retain the contact with decreasing angle. If θ is above this range, the invention is operable but the resolved forces make it difficult to achieve a freely movable interface. However, the invention is not operable if θ is identically zero degrees or 90 degrees.

The interface 28 is "freely movable". That is, movement of the first contact surface 32 relative to the second contact surface 36 at the interface 28 is not restrained in a radial direction parallel to the interface 28. The relative movement of the contact surfaces 32 and 36 is achieved by any operable approach. The movement is preferably achieved by a sliding action, but it may be effected by bearings such as roller bearings on the surfaces 32 and 36.

The sum ($H_1+H_2$) is equal to $H_T$, the total height of the controlled-expansion structure 20 between the first marker location 24 and the second marker location 26. The variation of $H_T$ with temperature is a primary consideration of the present approach, as it expresses how the distance between the marker locations 24 and 26 changes with temperature. The marker locations 24 and 26 are typically affixed to the external structure whose dimension is to be controlled during temperature changes.

Figure 3:
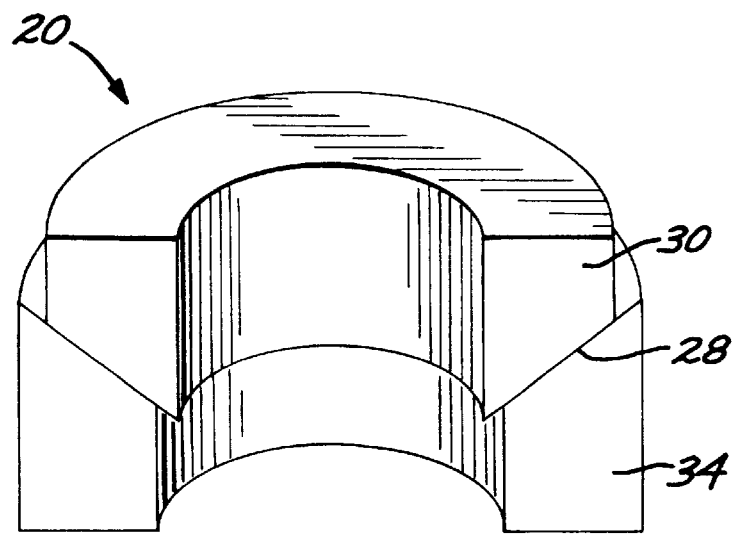
FIG. 3 is a schematic sectional view like that of FIG. 2, except after the temperature has changed.

FIGS. 1 and 2 depict the structure of the controlled-expansion structure 20 at an initial temperature $T_o$. When the temperature is changed by ΔT, the geometry of the controlled-expansion structure 20 changes. FIG. 3 illustrates the controlled-expansion structure 20 after a temperature change in a case where the materials of construction of the first expansion element 30 and the second expansion element 34 are each isotropic, $α_2$ is greater than $α_1$ (for example, the first expansion element 30 might be made of steel, and the second expansion element 32 might be made of aluminum alloy) and ΔT is positive (i.e., the temperature increases). The first expansion element 30 does not expand radially as much as the second expansion element 32, so that the second expansion element 32 effective slips outwardly relative to the first expansion element 32 along the freely movable interface 28.

The relative movement between the marker locations 24 and 26 may be expressed as follows:

$$H_T=(1+α_1ΔT)H_1+(1+α_2ΔT)H_2+ΔT(α_1D_1-α_2D_2)\tan(90-θ).$$

Differentiating this expression, the rate of change of $H_T$, the distance between the marker locations 24 and 26, with temperature is given by:

$$d(H_T)/dΔT=H_1α_1+H_2α_2+(α_1D_1-α_2D_2)\tan(90-θ).$$

The rate of change of $H_T$ with temperature is a function of the height dimensions, the diametral dimensions, the thermal expansion coefficients, and the interface angle θ. In an illustrative example where $D_1$ and $D_2$ are each 1 centimeter, $H_T$ is 1.5 centimeters, $H_1$ is 0.5 centimeters, $H_2$ is 1 centimeter, $α_1$ is $8×10^{-6}/°$ C. (representative of many steels), and $α_2$ is $25×10^{-6}/°$ C. (representative of many aluminum alloys), for the case of a desired zero change in $H_T$ over a temperature range of ΔT=+25° C., the required value of θ is calculated to be 30.4 degrees. By varying θ from this value, $H_T$ may be either increased or decreased in a controllable fashion. Similar analyses, although of more complexity, are applicable to the use of anisotropic materials and other geometries.

Figure 4:
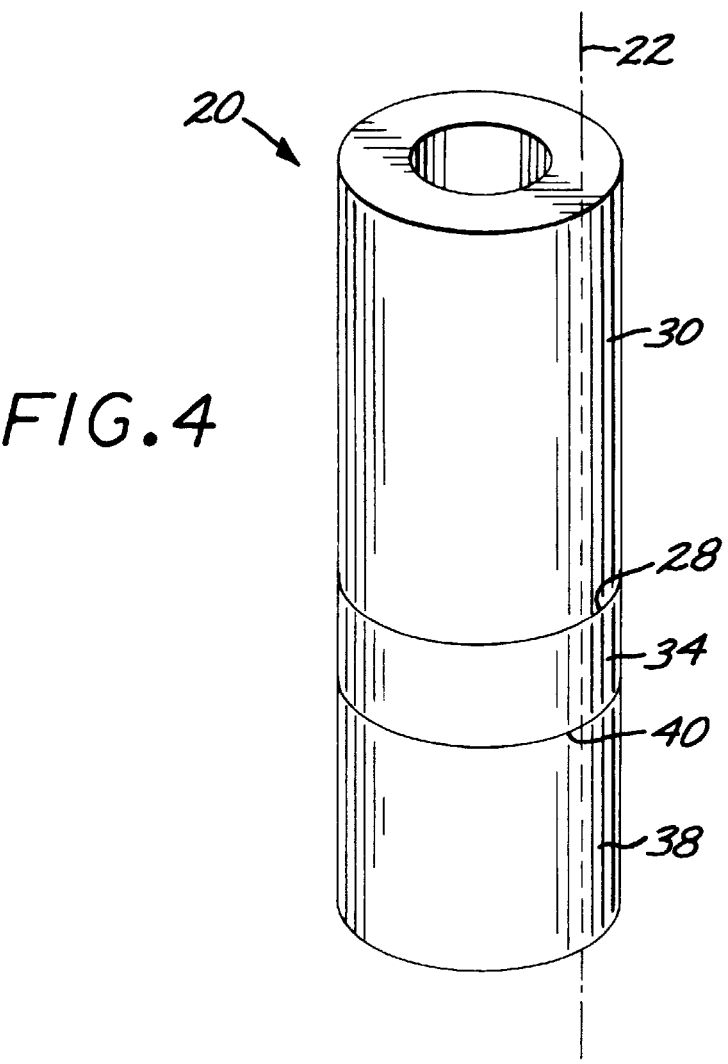
FIG. 4 is a schematic perspective view like that of FIG. 1, except with three expansion elements.

These principles may be extended to the use of additional expansion elements. FIG. 4 depicts a case where a third expansion element 38 is added to the structure of FIGS. 1–3, and has a freely movable second interface 40 with the second expansion element 34. The heights of the expansion elements 30, 34, and 38 parallel to the control axis 22 may be the same or, as illustrated, different. The prior discussion is incorporated as to the third expansion element 38 and the freely movable second interface 40.

Figure 5:
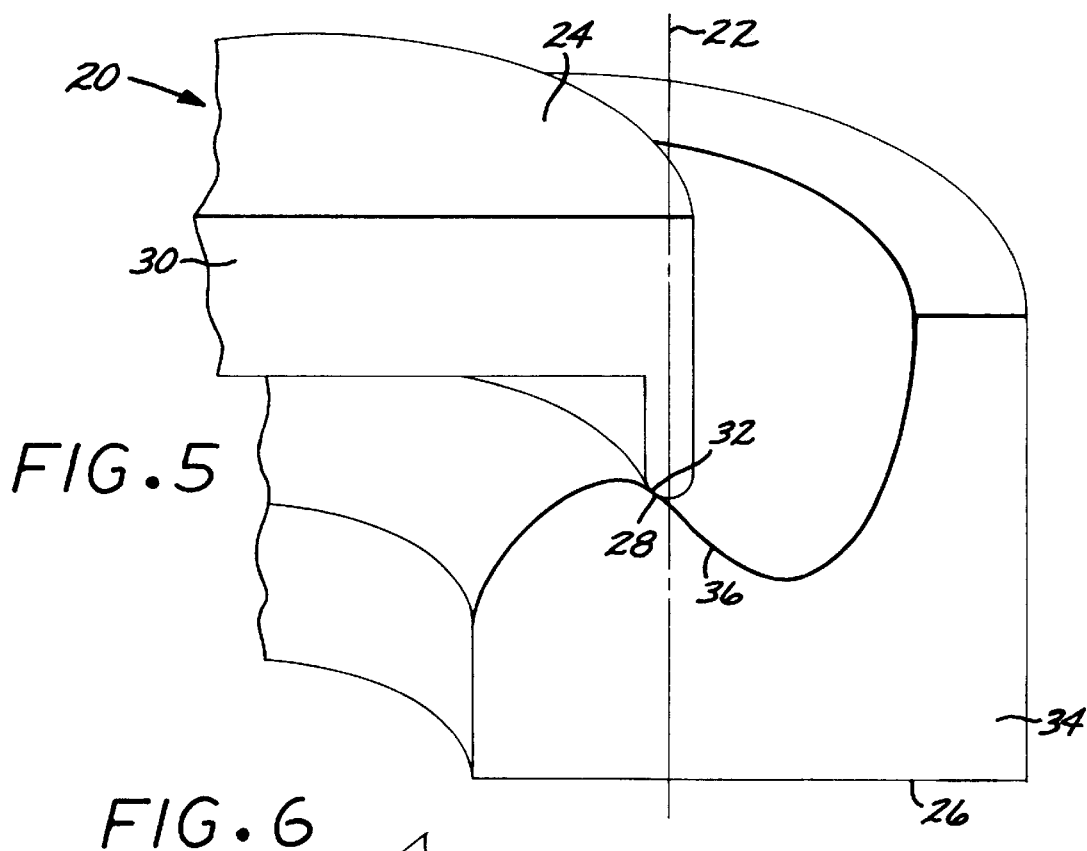
FIG. 5 is a fragmented sectional view of a nonlinear controlled-expansion structure in hollow cylindrical form.

The embodiments of FIGS. 1–4 utilize freely movable interfaces 28 and 40 that are nonplanar but regular and inclined at a constant angle θ. These planar interfaces produce a change in height $H_T$ that is linear with the change in temperature, except where the parameters are selected such that the height is constant. A nonlinear change in height may be produced by making the interface 28 nonplanar and nonregular in shape and inclined at a varying angle θ, as shown in FIG. 5. To do so, one of the contact surfaces, illustrated as the second contact surface 36, is curved with a varying angle θ and serves as a cam surface. The first contact surface 32 cannot have a corresponding structure, inasmuch as this would serve to lock the surfaces 32 and 36 together at one location, contrary to the requirement that they meet at the freely movable interface 28. However, the first contact surface 32 may be formed as a cam follower that rides on the nonplanar cam surface of the second contact surface 36, as illustrated in FIG. 5. The cam follower first contact surface 32 may be made rounded as shown, or even pointed in the case that the material of the second expansion element 34 is sufficiently hard that it is not scored by the pointed surface.

Figure 6:
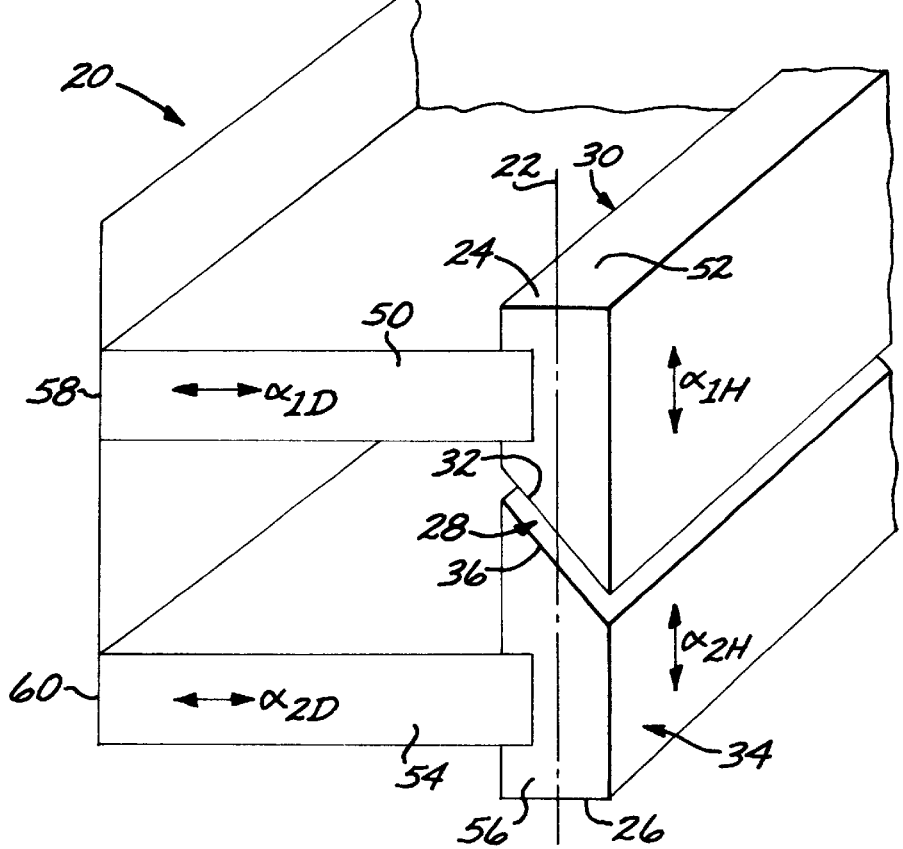
FIG. 6 is a schematic perspective view of an embodiment of the controlled-expansion structure using expansion arms and contact strips.
Figure 7:
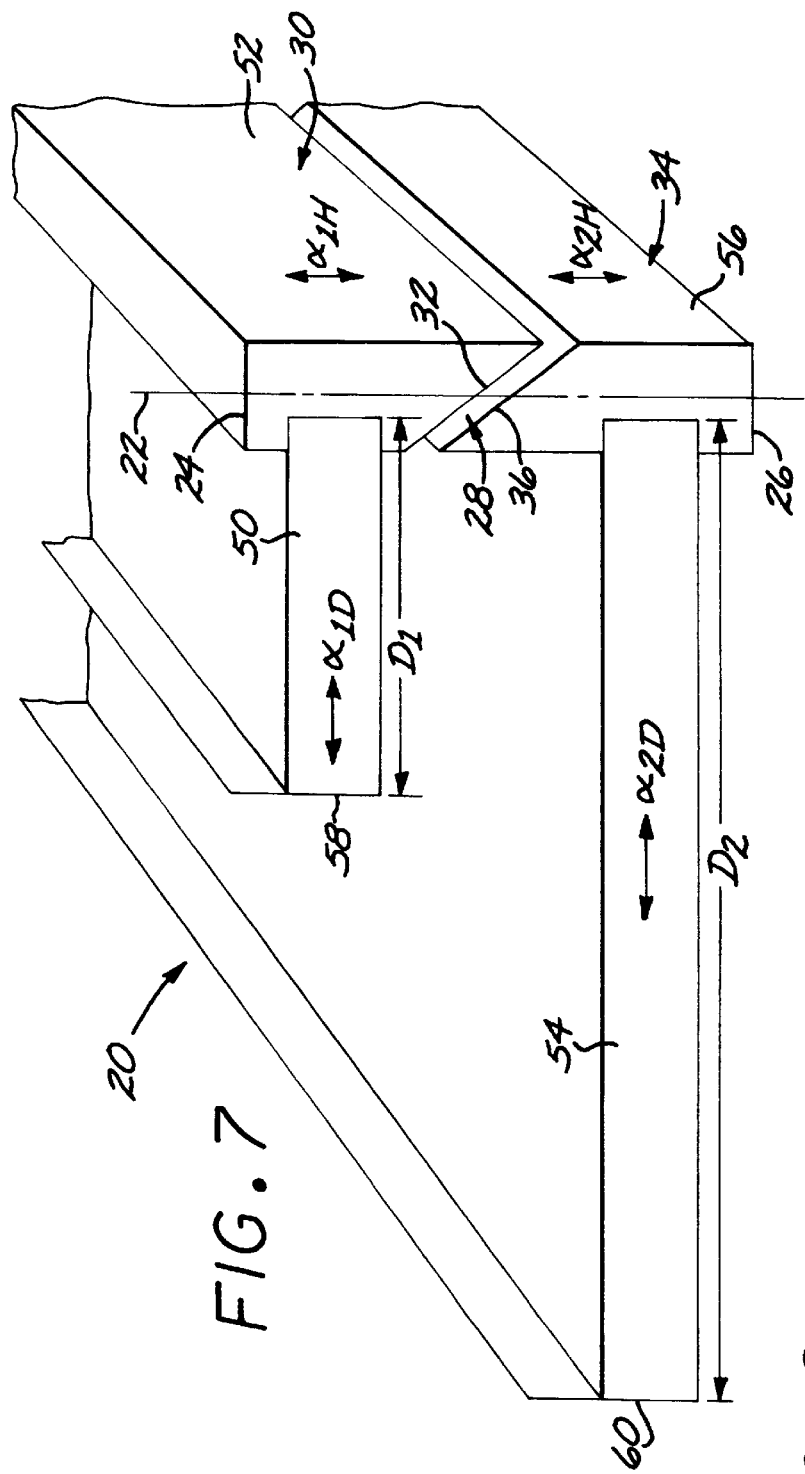
FIG. 7 is a schematic perspective view of another embodiment of the controlled-expansion structure using expansion arms and contact strips.

The present approach is not limited to the cylindrical geometry of FIGS. 1–5. FIGS. 6–7 illustrate another geometry, wherein the first expansion element 30 is formed as a first expansion arm 50 extending perpendicular to the control axis 22 and a first contact strip 52 affixed to the end of the first expansion arm 50. The first contact surface 32 is on the first contact strip 52. Similarly, the second expansion element 34 is formed as a second expansion arm 54 extending perpendicular to the control axis 22 and a second contact strip 56 affixed to the end of the second expansion arm 54. The second contact surface 36 is on the second contact strip 54. The facing surfaces of the two contact strips 52 and 56 are planar. Other components and features are as described above, and their discussion is incorporated.

In the cylindrical geometry of FIGS. 1–5, it is difficult to have $α_{1D}$ very different from $α_{1H}$, and to have $α_{1D}$ very different from $α_{1H}$. Relatively small differences may be achieved from anisotropic processing of the cylinder, but such differences are limited. In the geometry of FIGS. 6–7, on the other hand, the expansion arms 50 and 54 may be made of completely different materials than the respective contact strips 52 and 56. Consequently, large differences in the material thermal expansion coefficients may be achieved. The materials of the expansion arms 50 and 54 may instead be substantially the same as the materials of the respective contact strips 52 and 56.

The embodiment of FIG. 7 is like that of FIG. 6, except that the length $D_1$ of the first expansion arm 50 and the length $D_2$ of the second expansion arm 52 are unequal when measured from their respective fixed points 58 and 60 to their respective contact strips 52 and 56. One or both of the lengths $D_1$ and $D_2$ could be made adjustable, as with an adjustable clamp at the respective fixed points 58 and 60. Such an adjustment would provide a fine tuning for the expansion behavior of the controlled-expansion structure 20. In summary, geometries of the controlled expansion structure 20 such as illustrated in FIGS. 6–7 allow great flexibility in the selection of the parameters that govern the expansion properties parallel to the control axis 22.

Figure 8:
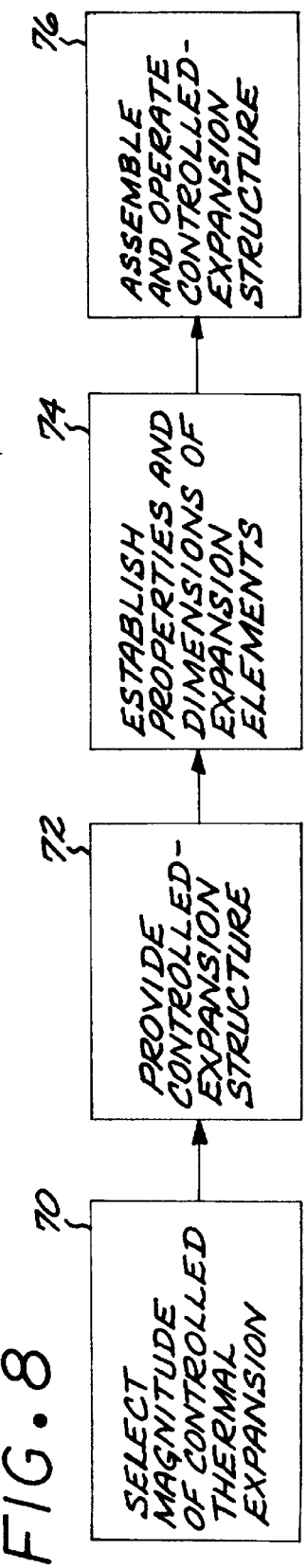
FIG. 8 is a block flow diagram of an approach for practicing the invention.

FIG. 8 illustrates an approach for practicing the method of the present invention. The magnitude (and sign) of the desired controlled thermal expansion is selected, numeral 70. If the controlled thermal expansion is nonzero, the linear or nonlinear variation as a function of temperature may be selected as well. The controlled-expansion structure 20 is provided, numeral 72, in an embodiment described above or otherwise. The material properties dimensions of the expansion elements are determined, for example by the analytical approach described above, numeral 74. The controlled-expansion structure 20 is fabricated according to this design, assembled, and operated, numeral 76.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A controlled-expansion structure having a controlled thermal expansion along a control axis extending between two marker locations over a temperature range, comprising:
    a first expansion element having a first marker location and a first contact surface, the first expansion element having a first coefficient of thermal expansion;
    a second expansion element having a second marker location and a second contact surface, the second expansion element having a second coefficient of thermal expansion different from the first coefficient of thermal expansion; and
    a freely movable interface formed by a contact between the first contact surface and the second contact surface, the interface being oriented at an interface angle relative to the control axis of greater than 0 but less than 90 degrees.

2. The controlled-expansion structure of claim 1, wherein the controlled thermal expansion between the two marker locations is substantially zero.

3. The controlled-expansion structure of claim 1, wherein the controlled thermal expansion between the two marker locations is not substantially zero.

4. The controlled-expansion structure of claim 1, wherein the contact between the first contact surface and the second contact surface is a sliding contact.

5. The controlled-expansion structure of claim 1, wherein each of the expansion elements is a hollow cylinder.

6. The controlled-expansion structure of claim 1, wherein each of the first expansion element and the second expansion element comprises an expansion arm and a contact strip affixed to the expansion arm and having the respective contact surface thereon.

7. The controlled-expansion structure of claim 1, wherein the first contact surface and the second contact surface are each planar.

8. The controlled-expansion structure of claim 1, wherein the first contact surface and the second contact surface are each nonplanar.

9. A controlled-expansion structure having a controlled thermal expansion along a control axis extending between two marker locations over a temperature range, comprising:
    a first expansion element having
        a first marker location,
        a first contact surface,
        a first mean perpendicular dimension $D_1$ measured perpendicular to the control axis,
        a mean height dimension $H_1$ measured between the first marker location and the first contact surface,
        a first axial coefficient of thermal expansion $\alpha_{1H}$ measured parallel to the control axis, and
        a first transverse coefficient of thermal expansion $\alpha_{1D}$ measured parallel to $D_1$;
    a second expansion element having
        a second marker location,
        a second contact surface,
        a second mean perpendicular dimension $D_2$ measured perpendicular to the control axis and parallel to the first perpendicular dimension,
        a mean height dimension $H_2$ measured between the second marker location and the second contact surface,
        a second axial coefficient of thermal expansion $\alpha_{2H}$ measured parallel to the control axis, and
        a second transverse coefficient of thermal expansion $\alpha_{2D}$ measured parallel to $D_1$, wherein there is a structural inequality of the first expansion element and the second expansion element selected from the group consisting of $\alpha_{1H}$ different from $\alpha_{2H}$, $\alpha_{1D}$ different from $\alpha_{2D}$, and $D_1$ different from $D_2$, and combinations thereof; and
    a freely movable interface formed by a contact between the first contact surface and the second contact surface, the interface being oriented at an interface angle θ relative to the control axis of greater than 0 but less than 90 degrees.

10. The controlled-expansion structure of claim 9, wherein the controlled thermal expansion between the two marker locations is substantially zero.

11. The controlled-expansion structure of claim 9, wherein the controlled thermal expansion between the two marker locations is not substantially zero.

12. The controlled-expansion structure of claim 9, wherein each of the expansion elements is a hollow cylinder.

13. The controlled-expansion structure of claim 9, wherein each of the first expansion element and the second expansion element comprises an expansion arm and a contact strip affixed to the expansion arm and having the respective contact surface thereon.

14. The controlled-expansion structure of claim 9, wherein the first contact surface and the second contact surface are each planar.

15. The controlled-expansion structure of claim 9, wherein the first contact surface and the second contact surface are each nonplanar.

16. The controlled-expansion structure of claim 9, wherein
    $\alpha_{1H}$ and $\alpha_{1D}$ are the same and are equal to $\alpha_1$, and $\alpha_{2H}$ and $\alpha_{2D}$ are the same and are equal to $\alpha_2$, and wherein $$H_T = (1+\alpha_1 \Delta T)H_1 + (1+\alpha_2 \Delta T)H_2 + \Delta T(\alpha_1 D_1 - \alpha_2 D_2)\tan(90-\theta)$$

where $H_T = H_1 + H_2$ at an initial temperature and $\Delta T$ is a temperature change from the initial temperature.

17. A method of establishing a controlled thermal expansion along an control axis between two marker locations over a temperature range, comprising the steps of
    selecting the magnitude of the controlled thermal expansion;

providing a controlled-expansion structure having
   a first expansion element having a first marker location and a first contact surface, the first expansion element having a first coefficient of thermal expansion,
   a second expansion element having a second marker location and a second contact surface, the second expansion element having a second coefficient of thermal expansion different from the first coefficient of thermal expansion, and
   a freely movable interface formed by a contact between the first contact surface and the second contact surface, the interface being oriented at an interface angle relative to the control axis of greater than 0 but less than 90 degrees; and
establishing material properties and dimensions of the first expansion element and the second expansion element, and the interface angle to achieve the controlled thermal expansion along the control axis between the first marker location and the second marker location.

* * * * *